Patented Sept. 4, 1951

2,566,521

UNITED STATES PATENT OFFICE 2,566,521

ALUMINA-PLATINUM OXYSULFIDE-HALOGEN CATALYST AND ITS PREPARATION

Vladimir Haensel, Hinsdale, Ill., assignor to Universal Oil Products Company, Chicago, Ill., a corporation of Delaware No Drawing. Application November 16, 1948, Serial No. 60,382

17 Claims. (Cl. 252—439)

This invention relates to the manufacture of catalysts and particularly to the manufacture of platinum-containing catalysts. This invention also relates to novel compositions of matter comprising these catalysts.

An object of this invention is to produce a catalyst with high activity for effecting hydrocarbon conversion reactions.

Another object of this invention is to produce a catalyst useful in the reforming of hydrocarbon fractions such as gasoline to produce reformed hydrocarbons of improved anti-knock properties.

Platinum-containing catalysts and various methods of manufacturing these catalysts have been suggested heretofore. However, these catalysts have been of limited commercial acceptance because of the high cost thereof. The present invention is based on the discovery that exceptionally good catalysts may be prepared by specific methods of preparation to be described hereafter in detail.

One embodiment of the present invention relates to a method of preparing a catalyst which comprises commingling a halide with alumina, compositing platinum sulfide therewith, converting the composited platinum sulfide into an oxygen-containing compound and subsequently heating the composite.

Another embodiment of this invention relates to a method of preparing a catalyst which comprises preparing a mixture of alumina and a combined halogen, the halogen being in an amount of from about 0.1% to about 8% by weight of said alumina on a dry basis, compositing platinum sulfide therewith, converting the composited platinum sulfide into an oxygen-containing compound and subsequently heating the composite.

A further embodiment of this invention relates to a method of preparing a catalyst which comprises precipitating alumina from aluminum chloride, commingling hydrogen fluoride therewith in an amount corresponding to from about 0.1 to about 3% by weight of fluorine based upon said alumina, adding hydrogen sulfide to a chloroplatinic acid solution, commingling the resultant suspension of platinum sulfide with said alumina, subjecting the resulting wet composite to oxidation to convert the platinum sulfide into an oxygen-containing compound and thereafter heating the resultant composite at a temperature of from about 800° to about 1200° F.

A still further embodiment of this invention relates to a method of preparing a catalyst which comprises adding a basic precipitant to aluminum chloride to form hydrate of alumina, selectively washing said hydrate of alumina to retain chloride in an amount corresponding to from about 0.2 to about 8% by weight of chloride, based upon the alumina content of said hydrate of alumina, adding hydrogen sulfide to a chloroplatinic acid solution to form a colloidal suspension of platinum sulfide, commingling the resultant colloidal suspension with said hydrate of alumina, thereafter converting the platinum sulfide into an oxygen-containing compound, drying and heating the resultant composite at a temperature of from about 800° to about 1200° F.

An additional embodiment of this invention relates to a novel composition of matter comprising alumina, platinum oxysulfide and from about 0.1 to about 8% by weight of a halogen in chemical combination with the other constituents of said composition.

As hereinbefore set forth, applicant has found that exceptionally good catalysts are prepared in accordance with the novel features of the present invention. While these catalysts may contain larger concentrations of platinum, which may range up to about 10% by weight or more of the alumina, it has been found that exceptionally good catalysts may be prepared to contain as low as from about 0.01% to about 1% by weight of platinum. Catalysts of the low platinum concentrations are particularly preferred in the present invention because of the considerably lower cost of the catalyst. It is well-known that platinum is very expensive and any satisfactory method of reducing the amount of platinum required in catalysts considerably reduces the cost of the catalyst and thus enhances the attractiveness of the catalyst for use in commercial processes. The platinum generally comprises a major portion of the cost of the catalyst and, therefore, by reducing the amount of platinum required to one-half, for example, reduces the cost of the catalyst substantially by one-half. Further, for example, when the amount of platinum is reduced to about 0.1% by weight as against 5% by weight, or more, as heretofore required, it is readily apparent that the cost of the catalyst is reduced by at least 50 times.

However, in order to obtain improved results with these low platinum concentrations, it is necessary that a particular type of supporting component must be composited with the platinum. It has been found that alumina shows unexpected advantages for use as a supporting component for the low platinum concentrations, apparently due to some peculiar association of the alumina with the platinum, either as a chemical combination or merely as a physical association. It has been found that these specific combinations of alumina and low platinum concentration, not only form very active catalysts, but also that such composites have a long catalyst life; that is, the catalysts retain their high activities for long periods of service. After these long periods of service, the catalyst may show a drop in activity and it has been found further that the particular combination of alumina and platinum renders the catalyst susceptible to ready regeneration.

To improve these catalysts further, it is an essential feature of the present invention that the final catalyst contain halogen in a specific concentration in combination with other constituents thereof. It has been found that the presence of combined halogen within a specific range of proportions enhances the initial activity of the catalyst and also serves to increase the life of the catalyst. It is believed that the halogen enters into some chemical combination or loose complex with the alumina and/or platinum, and thereby serves to improve the final catalyst.

While any of the halogens will serve to effect improved results, fluorine is preferred in the combination with the alumina and/or platinum or other constituent of the final catalyst. Next in order of preference is chlorine, while bromine and iodine are generally less preferred. It is understood that while all of these halogens will serve to effect an improvement, they are not necessarily equivalent.

The catalyst of the present invention may be prepared in any suitable manner, a particularly preferred method is to prepare alumina by adding a suitable reagent, such as ammonium hydroxide, ammonium carbonate, etc. to a salt of aluminum, such as aluminum chloride, aluminum sulfate, aluminum nitrate, etc. in an amount to form aluminum hydroxide which upon drying is converted to alumina and, in the interest of simplicity, the aluminum hydroxide is referred to as alumina in the present specification and claims in order that the percentages are based on alumina free of combined water. It has been found that aluminum chloride is generally preferred as the aluminum salt, not only for convenience in subsequent washing and filtering procedures, but also because it appears to give best results. Another suitable method is to react sodium aluminate with aluminum chloride or other suitable aluminum salt in order to prepare the alumina.

After the alumina has been formed, it is generally washed to remove soluble impurities. Usual washing procedures comprise washing with water, either in combination with filtration or as separate steps. It has been found that filtration of the alumina is improved when the wash water includes a small amount of ammonium hydroxide. The severity of washing will depend upon the particular method employed in preparing the catalyst. In one embodiment of the invention, the alumina is thoroughly washed with a suitable amount of water and preferably water containing ammonium hydroxide to reduce the chlorine content of the alumina to below about 0.1%. In another embodiment of the invention this washing may be selective to retain chlorides so as to contain from about 0.2% to about 5% by weight of chlorine to alumina on a dry basis. In accordance with this method of preparing the catalyst, the chlorine content thereof is obtained from the original aluminum chloride and is retained in the alumina, thus avoiding the necessity of adding a chloride in a later step of the catalyst preparation method. However, it is generally difficult to control the washing procedure so as to retain the desired halogen content and, for this reason, it is usually preferred to wash the aluminum hydroxide also referred to as hydrate of alumina to remove substantially all of the chloride ions and thereafter to add a desired halide in a controlled amount. The addition of halogen in this manner permits better control of the amount of halogen being added.

Also the washing may be selective to retain chlorides in an amount constituting a portion of the total halogen content desired and the remaining portion of the desired halogen content is then added in a subsequent step. In this method, the added halide may comprise the same halogen or mixtures of two different halogens, for example, chlorine and fluorine.

In some cases, it may be desirable to commingle with the catalyst composite an organic acid and particularly acetic acid which has been found to have a favorable effect on the catalyst. The acetic acid apparently serves to peptize the aluminum hydrate and thereby renders it in a better condition for compositing with the platinum and also partly to fix the platinum to the hydrate of alumina so that migration of the platinum on the alumina is minimized during subsequent heating. When acetic acid is used, the amount will generally be within the range of from about 0.05 to about 0.5 mole per acetic acid per mole of aluminum hydrate.

Alumina prepared in the above manner, after washing and filtration, is generally recovered as a wet cake. The wet cake is usually made into a slurry with water and sent to a separate zone for further handling. When the combined halogen is to be added separately, it preferably is done at this stage of the catalyst preparation, that is, before the platinum compound is commingled with the alumina. The halogen may be added in any suitable manner. However, the halogen should be added in a form which will readily react with the alumina in order to obtain the desired results and also must not leave undesired deposits in the catalyst. A preferred method of adding the halogen is in the form of an acid, such as hydrogen fluoride, hydrogen chloride, hydrogen bromide, and/or hydrogen iodide. Hydrogen fluoride, also referred to herein as hydrofluoric acid, is preferably added as an aqueous solution for ease in handling and for control of the specific amount to be added. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromide, or iodine, but, in view of the fact that fluorine and chlorine normally exist as gases, it is generally preferable to utilize them in the form of a solution for ease in handling. In some cases, the inclusion of certain components will not be harmful but may be beneficial, and in these cases the halogen may be added in the form of other salts.

The concentration of combined halogen in the finished catalyst will be within the range of from about 0.1% to about 8% by weight of the alumina on a dry basis. The chemically combined fluorine appear to be more active, and, therefore, will be used within the range of from about 0.1% to about 3% by weight of the alumina on a dry basis. The chloride content will be used within the range of from about 0.2% to about 8% and preferably from about 0.5% to about 5% by weight of the alumina on a dry basis. It has been found that halogen concentrations below these lower limits do not give the desired improvement, and on the other hand, concentrations of halogen above the upper limits adversely affect the selectivity of the catalyst, thus catalyzing side reactions to an extent greater than desired.

After the alumina and halogen have been intimately mixed, the platinum may be added in any suitable manner. A particularly preferred method is to form a separate solution of chloroplatinic acid in water and introduce hydrogen sulfide into this solution at room temperature, until the chloroplatinic acid solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more chemical compounds referred to herein as platinum sulfides. Best results have been obtained in this method when the hydrogen sulfide is added at a temperature of about 70°–80° F. to the chloroplatinic acid solution. The addition of hydrogen sulfide at an elevated temperature of 175° F. appears to produce less satisfactory catalysts. The brown colloidal suspension of platinum sulfide formed from chloroplatinic acid and hydrogen sulfide may be commingled with the slurry of wet alumina gel at room temperature and the slurry is stirred sufficiently to obtain intimate mixing of these two components. The resultant slurry is then subjected to oxidation to convert the platinum sulfide into an oxygen-containing platinum compound including platinum oxysulfide. This oxidation treatment can be accomplished by blowing the hydrated slurry with air or by treating the slurry with small amounts of hydrogen peroxide or other oxidizing agents.

In another embodiment of this invention, the colloidal suspension of platinic sulfide in water is blown with air prior to the addition of the suspension to the alumina gel. As will be seen in the subsequent example, this oxidation step is an essential part of this invention and its inclusion in the catalyst manufacturing procedure has a profound effect on the catalyst activity.

The exact nature of the reaction which occurs upon treatment of platinic sulfides with oxygen is not clearly understood. It appears that the compound formed is a hydrate of platinum oxysulfide, PtOS. A number of such hydrates may exist. The formation of the sulfur and oxygen containing compound of platinum takes place very readily upon bubbling air through a colloidal suspension of platinic sulfides in water. The latter are formed rapidly upon bubbling gaseous hydrogen sulfide into a dilute solution of chloroplatinic acid. The suspension is brown in color and upon bubbling air into this suspension, the color changes first to a dark brown and finally becomes almost black.

In the preferred embodiment of the invention, the platinum is added in an amount to produce a final catalyst containing from about 0.01% to about 1% by weight of platinum.

In another method of operation, chloroplatinic acid solution may be added to the slurry of alumina gel, and hydrogen sulfide then is added to the mixture. In this method of operation, it has been found that the hydrogen sulfide may be added at room temperature or at an elevated temperature of 175° F.

After the platinum in proper concentration has been commingled with the alumina hydrate and after the resultant slurry has been oxidized as hereinabove set forth, the resultant mixture is dried, preferably at a temperature of from about 200° to about 400° F., for a period of time of from about 4 to 24 hours or more to form a cake. In some cases, it is desired to prepare the catalyst in the form of pills of uniform size and shape, and this may readily be accomplished by grinding the partially dried catalyst cake, adding a suitable lubricant, such as stearic acid, rosin, hydrogenated coconut oil, graphite, etc., and then forming into pills in any suitable pelleting apparatus. Particularly satisfactory pills comprise those of a size ranging from about 3 x 3 mm. to 6 x 6 mm. or thereabouts. Pills of uniform size and shape may also be formed by extrusion methods. In some cases, it may be desired to utilize the catalyst as powder or granules of irregular size and shape, in which cases the pilling and extrusion operations may be omitted.

The catalyst may now be subjected to high temperature treatment, and this may comprise one or several methods. A preferred method is to subject the catalyst to calcination at a temperature of from about 800° to about 1200° F. for a period of from about 2 to 8 hours or more. Another method is to subject the catalyst to reduction with hydrogen or hydrogen-containing gas at a temperature of from about 300° to about 600° F. for about 4 to 12 hours or more, preferably followed by calcination at a temperature of from about 800° to about 1200° F.

In some cases the lubricant will be removed during the high temperature heating. In other cases, as for example, when graphite is used as the lubricant, the separate high temperature heating step may be omitted, and the effective heat treatment of the catalyst may be obtained in the plant before or during processing of the hydrocarbons.

Although the catalyst of the present invention will have a long life, it may be necessary to regenerate the catalyst after long periods of service. The regeneration may be effected by treatment with air or other oxygen-containing gas to burn carbonaceous deposits therefrom. In general, it is preferred to control the regeneration temperature not to exceed about 1200° F. In some cases it may be desirable to follow the burning operation with treatment with hydrogen-containing gas at temperatures of from about 700° to about 1100° F.

The improved catalyst of the present invention may be employed in any process for which platinum is a catalyst. The improved catalysts are particularly satisfactory for reforming operations in which a saturated gasoline, such as straight-run gasoline, natural gasoline, etc., is subjected to conversion to produce a reformed gasoline of improved anti-knock properties. The saturated gasoline generally comprises a mixture of naphthenic and paraffinic hydrocarbons and the reforming operation effects dehydrogenation of the naphthenic hydrocarbons to aromatics, cyclization of the paraffinic hydrocarbons to aromatics, as well as effects a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and converts higher boiling fractions to lower boiling fractions within the range of gasoline. However, this cracking must be controlled because excessive cracking produces excessive amounts of normally gaseous products and also excessive carbonaceous deposits on the catalyst and deactivation of the catalyst. The improved catalysts of the present invention are particularly desirable for reforming operations because the catalyst promotes the desired aromatization and controlled cracking under selected conditions of operation.

The catalyst of the present invention may also find utility in treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with other fractions.

The catalyst of the present invention may prove particularly useful for destructive hydrogenation or hydrocracking reactions in which hydrocarbons and particularly oils heavier than gasoline are subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting hydrogenation reactions including the hydrogenation of unsaturated aliphatic hydrocarbons, such as monoolefins, diolefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts. In reactions involving hydrogenation, oxidation or condensation, it is preferred that the halogen content of the catalyst be within the lower limits of the range hereinbefore specified in order to minimize side reactions.

As hereinbefore set forth, selected processing conditions are required depending upon the particular reaction desired. For reforming of straight-run gasoline the temperature employed should be within the range of from about 600° to about 1000° F., the pressure within the range of from about 50 to about 1000 pounds per square inch and the weight hourly space velocity within the range of from about 0.5 to about 10. For dehydrogenation of normal butane the temperature should be within the range of from about 800° to about 1025° F., the pressure from about atmospheric to about 50 pounds per square inch and the gaseous hourly space velocity from about 200 to about 5000. For hydrogenation reactions the temperature may range from atmospheric to about 500° F., the pressure from about 100 to about 3000 pounds or more, and the weight hourly space velocity from about 0.5 to about 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into a reaction zone as a slurry in the hydrocarbon oil.

The following examples are introduced to further illustrate the novelty and utility of the present invention, but not with the intention of unduly limiting the same.

The following runs were carried out in reforming a Mid-Continent straight-run naphtha fraction (boiling point 182 to 402° F.) at a catalyst temperature of 455° C., 3 to 1 hydrogenhydrocarbon ratio, 2 hourly liquid space velocity and a pressure of 500 pounds per square inch. These runs were conducted over a period of 3 days following which a carbon determination was made on each of the catalysts. The results obtained with the catalysts described below are shown in the following Tables I and II.

Catalysts A, B, C, and D were prepared to contain 0.3% Pt. and 0.75% fluorine based on dry $Al_2O_3$. In preparing catalyst A chloroplatinic acid solution was treated with gaseous hydrogen sulfide to give a colloidal suspension of platinic sulfides. This suspension was then added to the alumina hydrogel which was previously treated with a solution of hydrogen fluoride. In catalyst B the same procedure was used except that prior to the drying of the final slurry, it was heated to 85° C. and blown with air followed by drying in the regular manner. It will be observed that this method of preparation yields a catalyst with lower carbon forming tendencies. A further improvement in carbon forming tendencies was found to occur with catalyst C which was prepared in the same manner as catalyst A except that prior to the addition of the colloidal suspension of platinic sulfides to the alumina gel containing hydrogen fluoride, the gel was treated with a small amount of 30% hydrogen peroxide solution. It will be observed that catalyst C as compared to catalyst A has better performance characteristics from the standpoint of yield and product quality, and at the same time produces only about 60% of the carbon made in the presence of catalyst A. Catalyst D was made in the same manner as catalyst A except that prior to the addition of the colloidal suspension of platinic sulfides to the alumina gel, the suspension was treated with a small amount of a hydrogen peroxide solution. Catalyst D also shows lower carbon forming tendencies but does not give quite the same product quality as catalysts B and C.

ride in an amount corresponding to from about 0.2 to about 8% by weight of chlorine based upon the alumina content of said hydrate of alumina, adding hydrogen sulfide to a chloroplatinic acid solution to form a colloidal suspension of a platinum sulfide, commingling the resultant colloidal suspension with said hydrate of alumina, thereafter subjecting the commingled material to an oxidation treatment, drying and heating the resultant composite at a temperature of from about 800° to about 1200° F.

4. A method of preparing a catalyst which comprises adding a basic precipitant to aluminum chloride to form hydrate of alumina, washing said hydrate of alumina to remove chlorides to below about 0.1% by weight chlorine based on alumina, adding a fluoride to give a fluorine content of from about 0.1% to about 3% by weight of said alumina, separately commingling hydrogen sulfide with a chloroplatinic acid solution

Table I

| Catalyst | A | | | | B | | |
|---|---|---|---|---|---|---|---|
| | Charge | 1st day | 2nd day | 3rd day | 1st day | 2nd day | 3rd day |
| Yield, Vol. Per Cent Charge | | 92.4 | 92.9 | 92.9 | 92.6 | 92.9 | 92.8 |
| Product: | | | | | | | |
| Octane Numbers, F-2 Clear | 34.6 | 74.4 | 74.2 | 74.0 | 75.3 | 75.5 | 75.4 |
| F-2+3 cc., TEL/Gal | 59.1 | | 86.0 | | | 85.5 | |
| F-1 Clear | 34.8 | 81.0 | 81.0 | 80.8 | 80.5 | 82.5 | 80.7 |
| F-1+3 cc., TEL/Gal | 60.3 | 91.4 | | 91.5 | 90.5 | | 91.1 |
| Per Cent Aromatics in product based on charge | 7.0 | 46.1 | 43.2 | 43.3 | 44.4 | 44.0 | 39.2 |
| Per cent of product boiling below 212° F. based on total liquid product | 3.0 | 19.0 | 21.0 | 21.0 | 24.0 | 23.0 | 22.0 |
| Carbon on catalyst, per cent by weight of catalyst after 3 days of operation | | | | 2.38 | | | 2.09 |

Table II

| Catalyst | C | | | | D | | |
|---|---|---|---|---|---|---|---|
| | Charge | 1st day | 2nd day | 3rd day | 1st day | 2nd day | 3rd day |
| Yield, Vol. Per Cent of Charge | | 92.6 | 93.1 | 93.3 | 92.7 | 92.9 | 93.2 |
| Product: | | | | | | | |
| Octane Numbers, F-2 Clear | 34.6 | 74.7 | 74.6 | 74.9 | 72.1 | 72.9 | 73.7 |
| F-2+3 cc., TEL/Gal | 59.1 | | | | | 84.6 | |
| F-1 Clear | 34.8 | 81.2 | 82.0 | 82.3 | 78.1 | 79.4 | 79.7 |
| F-1+3 cc., TEL/Gal | 60.3 | 91.8 | 90.3 | 92.9 | 90.4 | | 90.8 |
| Per Cent Aromatics in product based on charge | 7.0 | 43.3 | 41.1 | 42.6 | 42.3 | 43.3 | 42.7 |
| Per cent of product boiling below 212° F. based on total liquid product | 3.0 | 19.0 | 21.0 | 22.0 | 17.0 | 18.5 | 18.5 |
| Carbon on catalyst, per cent by wt. of catalyst after 3 days of operation | | | | 1.48 | | | 1.37 |

I claim as my invention:

1. A method of preparing a catalyst which comprises combining with alumina halogen in an amount of from about 0.1% to about 8% by weight of said alumina on a dry basis, compositing a platinum sulfide therewith, subjecting the composited sulfide to an oxidation treatment and subsequently heating the composite at a temperature of from about 800 to about 1200° F.

2. A method of preparing a catalyst which comprises precipitating alumina from aluminum chloride, commingling hydrogen fluoride therewith in an amount corresponding to from about 0.1 to about 3% by weight of fluorine based upon said alumina, adding hydrogen sulfide to a chloroplatinic acid solution, commingling the resultant suspension of platinum sulfide with said alumina, subjecting the resulting wet composite to an oxidation treatment, and thereafter heating the resultant composite at a temperature of from about 800° to about 1200° F.

3. A method of preparing a catalyst which comprises adding a basic precipitant to aluminum chloride to form hydrate of alumina, selectively washing said hydrate of alumina to retain chloto form a suspension of a platinum sulfide, commingling said suspension with said alumina containing combined fluorine, subjecting the resulting composite to an oxidation treatment, and thereafter heating the resultant composite at a temperature of from about 800° to about 1200° F.

5. A method of preparing a catalyst which comprises combining with alumina a halogen in an amount of from 0.1% to about 8% by weight of said alumina on a dry basis, compositing a platinum sulfide therewith in an amount to form a final catalyst containing from about 0.01% to about 1% by weight of platinum, subjecting the composite to an oxidation treatment, and subsequently heating said composite at a temperature of from about 800° to about 1200° F.

6. The method defined in claim 4 further characterized in that the hydrogen sulfide is added to said chloroplatinic acid solution at a temperature of about 70° to about 80° F. and the resultant colloidal suspension is commingled with said alumina at about the same temperature.

7. A method of preparing a catalyst which comprises adding a basic precipitant to aluminum chloride to form hydrate of alumina, washing said hydrate of alumina to remove chlorides to below about 0.1% by weight chlorine based on alumina, adding hydrofluoric acid to give a fluorine content of from about 0.1% to about 3% by weight of said alumina, separately commingling hydrogen sulfide with a chloroplatinic acid solution to form a suspension of a platinum sulfide, commingling said suspension with said alumina containing combined fluorine, subjecting the resulting composite to an oxidation treatment, and thereafter heating the resultant composite at a temperature of from about 800° to about 1200° F.

8. A method of preparing a catalyst which comprises precipitating hydrate of alumina from aluminum chloride, washing said hydrate of alumina to remove chlorides to below about 0.1% by weight chlorine based on alumina, adding hydrofluoric acid to give a fluorine content of from about 0.1% to about 3% by weight of said alumina, separately commingling hydrogen sulfide with a chloroplatinic acid solution to form a suspension of a platinum sulfide, commingling said suspension with said alumina containing combined fluorine, treating the resulting composite with a gas containing free oxygen, and thereafter heating the resultant composite at a temperature of from about 800° to about 1200° F.

9. A method of preparing a catalyst which comprises precipitating hydrate of alumina from aluminum chloride, washing said hydrate of alumina with water containing ammonium hydroxide to remove chloride ions to below about 0.1% by weight chlorine based on alumina, adding a dilute aqueous solution of hydrogen fluoride to said hydrate of alumina in an amount to form a final catalyst containing from about 0.1% to about 3% by weight of combined fluorine based on said alumina, separately commingling hydrogen sulfide with a chloroplatinic acid solution in an amount to form a final catalyst containing from about 0.01% to about 1% by weight of platinum, commingling the resultant solution with said hydrate of alumina containing combined fluorine, subjecting the composite to treatment with an oxidizing agent, and thereafter heating the resultant composite to a temperature of from about 800° to about 1200° F.

10. A method of preparing a catalyst which comprises precipitating hydrate of alumina from aluminum chloride, washing said hydrate of alumina to remove chlorides to below about 0.1% by weight of chlorine based on alumina, adding hydrofluoric acid to give a fluorine content of from about 0.1% to about 3% by weight of said alumina, separately commingling hydrogen sulfide with a chloroplatinic acid solution to form a suspension of a platinum sulfide, subjecting said suspension to an oxidation treatment, commingling the resultant oxidized suspension with said alumina containing combined fluorine and thereafter heating the resultant composite at a temperature of from about 800° to about 1200° F.

11. A method of preparing a catalyst which comprises precipitating hydrate of alumina from aluminum chloride, washing said hydrate of alumina to remove chlorides to below about 0.1% by weight chlorine based on alumina, adding hydrofluoric acid to give a fluorine content of from about 0.1 to about 3% by weight of said alumina, separately commingling hydrogen sulfide with a chloroplatinic acid solution to form a suspension of a platinum sulfide, treating said suspension of a platinum sulfide with a gas containing free oxygen, commingling the oxygen-treated suspension with said alumina containing the combined fluorine, and thereafter heating the resultant composite at a temperature of from about 800° to about 1200° F.

12. A method of preparing a catalyst which comprises precipitating hydrate of alumina from aluminum chloride, washing said hydrate of alumina to remove chlorides to below about 0.1% by weight chlorine based on alumina, adding hydrofluoric acid to give a fluorine content of from about 0.1 to about 3% by weight of said alumina, separately commingling hydrogen sulfide with a chloroplatinic acid solution to form a suspension of a platinum sulfide, subjecting said suspension to treatment with an oxidizing agent, commingling the oxidized suspension with said alumina containing combined fluorine, and thereafter heating the resultant composite at a temperature of from about 800° to about 1200° F.

13. A method of preparing a catalyst which comprises heating at a temperature of from about 800° to about 1200° F. a composite of a platinum compound and alumina having combined therewith a halogen in an amount of from about 0.1% to about 8% by weight of said alumina on a dry basis, said platinum compound resulting from an oxidation treatment of a platinum sulfide.

14. A method of preparing a catalyst which comprises combining with alumina a halogen in an amount of from about 0.1% to about 8% by weight of said alumina on a dry basis, adding hydrogen sulfide to a chloroplatinic acid solution to form a suspension of a platinum sulfide, subjecting said suspension to an oxidation treatment, and heating the thus treated suspension in admixture with said halogen-containing alumina at a temperature of from about 800° to about 1200° F.

15. A method of preparing a catalyst which comprises combining with alumina a halogen in an amount of from about 0.1% to about 8% by weight of said alumina on a dry basis, adding hydrogen sulfide to a chloroplatinic acid solution to form a suspension of a platinum sulfide, subjecting said suspension to an oxidation treatment, commingling the thus treated suspension with said halogen-containing alumina, and heating the resultant mixture at a temperature of from about 800° to about 1200° F.

16. A method of preparing a catalyst which comprises combining with alumina a halogen in an amount of from about 0.1% to about 8% by weight of said alumina on a dry basis, adding hydrogen sulfide to a chloroplatinic acid solution to form a suspension of a platinum sulfide, commingling said suspension with said halogen-containing alumina, subjecting the resultant mixture to an oxidation treatment, and heating the thus treated mixture at a temperature of from about 800° to about 1200° F.

17. A catalyst prepared by heating at a temperature of from about 800° to about 1200° F. a composite of a platinum sulfide previously subjected to an oxidation treatment and alumina having combined therewith a halogen in an amount of from about 0.1% to about 8% by weight of said alumina on a dry basis.

VLADIMIR HAENSEL.

REFERENCES CITED

The following references are of record in the file of this patent:

UNITED STATES PATENTS

| Number | Name | Date |
|---|---|---|
| 2,479,109 | Haensel | Aug. 16, 1949 |